(12) United States Patent
Westnedge et al.

(10) Patent No.: US 11,679,624 B2
(45) Date of Patent: Jun. 20, 2023

(54) FABRICATED AXLE SEAT ASSEMBLY

(71) Applicant: Hendrickson USA, L.L.C., Schaumburg, IL (US)

(72) Inventors: Andrew Westnedge, Granville, OH (US); Scott Kohler, Danville, OH (US); Timothy Stickle, Newark, OH (US); David Miller, Pickerington, OH (US)

(73) Assignee: Hendrickson USA, L.L.C., Schaumburg, IL (US)

( * ) Notice: Subject to any disclaimer, the term of this patent is extended or adjusted under 35 U.S.C. 154(b) by 163 days.

(21) Appl. No.: 16/649,909

(22) PCT Filed: Sep. 24, 2018

(86) PCT No.: PCT/US2018/052461
§ 371 (c)(1),
(2) Date: Mar. 23, 2020

(87) PCT Pub. No.: WO2019/060836
PCT Pub. Date: Mar. 28, 2019

(65) Prior Publication Data
US 2021/0362546 A1 Nov. 25, 2021

Related U.S. Application Data

(60) Provisional application No. 62/562,361, filed on Sep. 23, 2017.

(51) Int. Cl.
*B60B 35/00* (2006.01)
*B60B 35/08* (2006.01)
*B60G 9/00* (2006.01)

(52) U.S. Cl.
CPC ............ *B60B 35/008* (2013.01); *B60B 35/08* (2013.01); *B60G 9/003* (2013.01);
(Continued)

(58) Field of Classification Search
CPC ....... B60B 35/008; B60B 35/08; B60G 9/003; B60G 2204/126; B60G 2204/4306; B60G 2206/8103
(Continued)

(56) References Cited

U.S. PATENT DOCUMENTS 5,328,159 A * 7/1994 Kaufman ............... B60G 11/113
267/52
5,921,570 A * 7/1999 Lie ......................... F16F 1/3683
267/52
(Continued)

FOREIGN PATENT DOCUMENTS

DE 102012207157 A1 10/2013
DE 102013003301 A1 8/2014
(Continued)

OTHER PUBLICATIONS

International Search Report and Written Opinion from the International Searching Authority for International Application No. PCT/US2018/052461, dated Jan. 7, 2019 (23 Pages).

*Primary Examiner* — Toan C To
(74) *Attorney, Agent, or Firm* — Cook Alex Ltd.

(57) ABSTRACT

Axle seat assemblies and methods of manufacturing thereof, are provided for attachment to an axle body (15). The axle seat assembly may be comprised of a first piece (42) and a second piece (50). The first piece (42) may have a first wall, a second wall and a first axle seat piece engagement portion providing a first engagement surface. The second piece (50) may have a third wall and a second axle seat piece engagement portion providing a second engagement surface. The first wall and the second wall of the first piece are oriented to engage a front surface of an axle body and the third wall of the second piece is oriented to engage a rear surface (30) of an axle body. The first and second engagement surfaces of the respective first and second pieces of the axle seat
(Continued)

assembly are positioned and configured to engage one another to removably and reversibly secure with the use of a fastener the first piece to the second piece to form an axle seat assembly.

20 Claims, 20 Drawing Sheets

(52) U.S. Cl.
CPC .............. *B60G 2204/126* (2013.01); *B60G 2204/4306* (2013.01); *B60G 2206/8103* (2013.01)

(58) Field of Classification Search
USPC .......................................... 267/52
See application file for complete search history.

(56) References Cited

U.S. PATENT DOCUMENTS

| | | | | |
|---|---|---|---|---|
| 6,032,967 | A * | 3/2000 | Ogoniek | B60B 35/08 |
| | | | | 280/124.1 |
| 6,406,008 | B1 * | 6/2002 | Dudding | B60G 11/113 |
| | | | | 280/124.17 |
| 7,325,821 | B2 * | 2/2008 | Myers | B60B 35/007 |
| | | | | 301/124.1 |
| 7,360,774 | B2 * | 4/2008 | Saieg | B60G 7/001 |
| | | | | 280/124.13 |
| 7,475,892 | B2 * | 1/2009 | Dudding | B60G 7/04 |
| | | | | 280/124.13 |
| 7,748,726 | B2 * | 7/2010 | Dudding | B60G 11/28 |
| | | | | 280/124.116 |
| 8,029,008 | B2 * | 10/2011 | Cortez | B60G 11/113 |
| | | | | 280/124.175 |
| 9,770,956 | B2 * | 9/2017 | Dilworth | B60G 9/003 |
| 10,703,157 | B2 * | 7/2020 | Peck | B60G 11/08 |
| 2005/0218620 | A1 | 10/2005 | Reineck | |
| 2007/0126198 | A1 | 6/2007 | Kirkham | |
| 2008/0252031 | A1 | 10/2008 | Dudding et al. | |
| 2011/0175317 | A1 * | 7/2011 | Legros | B60G 11/27 |
| | | | | 280/124.157 |
| 2013/0056946 | A1 | 3/2013 | Davenport et al. | |
| 2013/0278047 | A1 | 10/2013 | Gottschalk | |
| 2014/0035250 | A1 * | 2/2014 | Dilworth | B60G 11/04 |
| | | | | 280/124.111 |
| 2016/0272027 | A1 * | 9/2016 | Dilworth | F16M 13/02 |
| 2020/0070607 | A1 * | 3/2020 | Miller | B60G 9/003 |

FOREIGN PATENT DOCUMENTS

| | | |
|---|---|---|
| EP | 0854057 A2 | 7/1998 |
| EP | 2607115 A1 | 6/2013 |

* cited by examiner

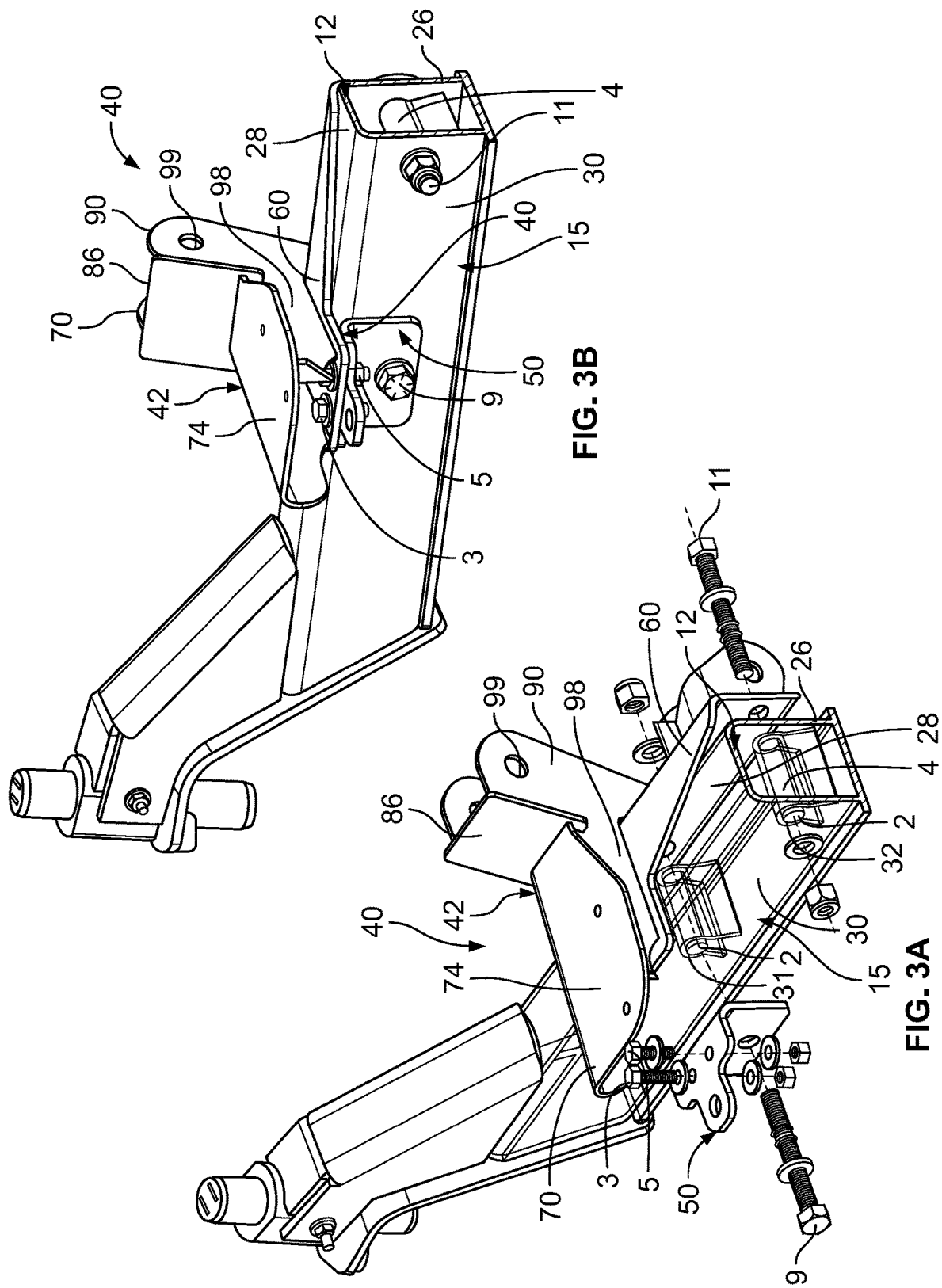

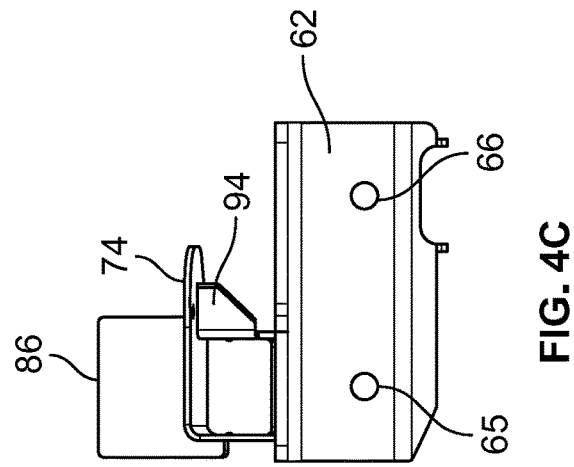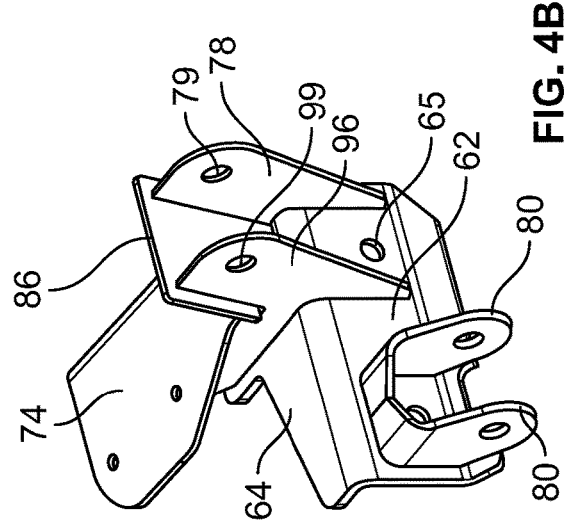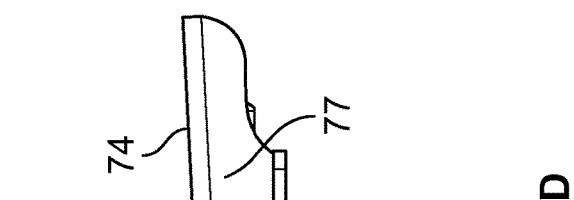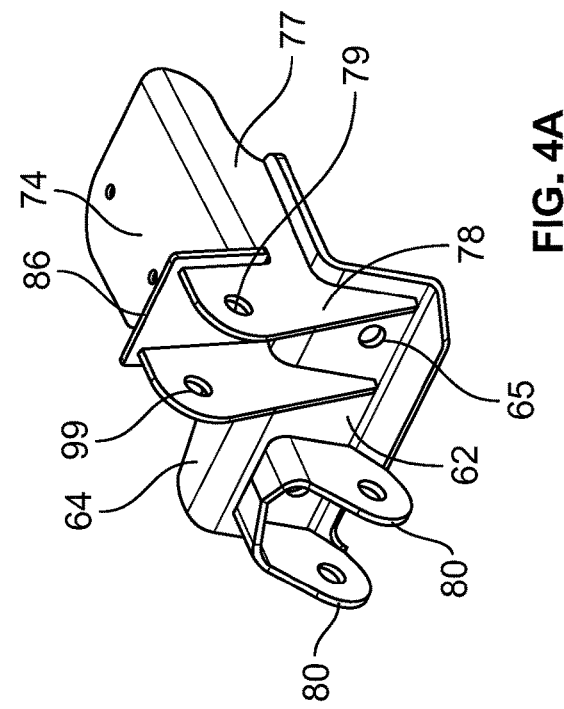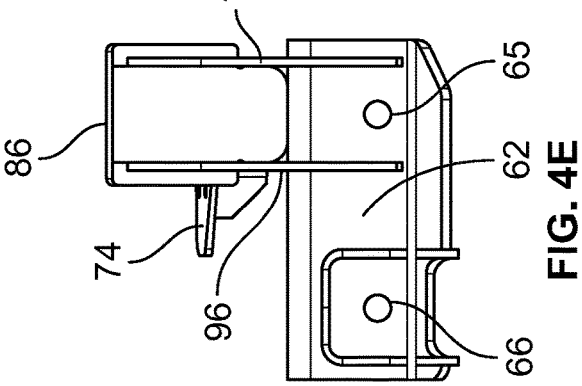

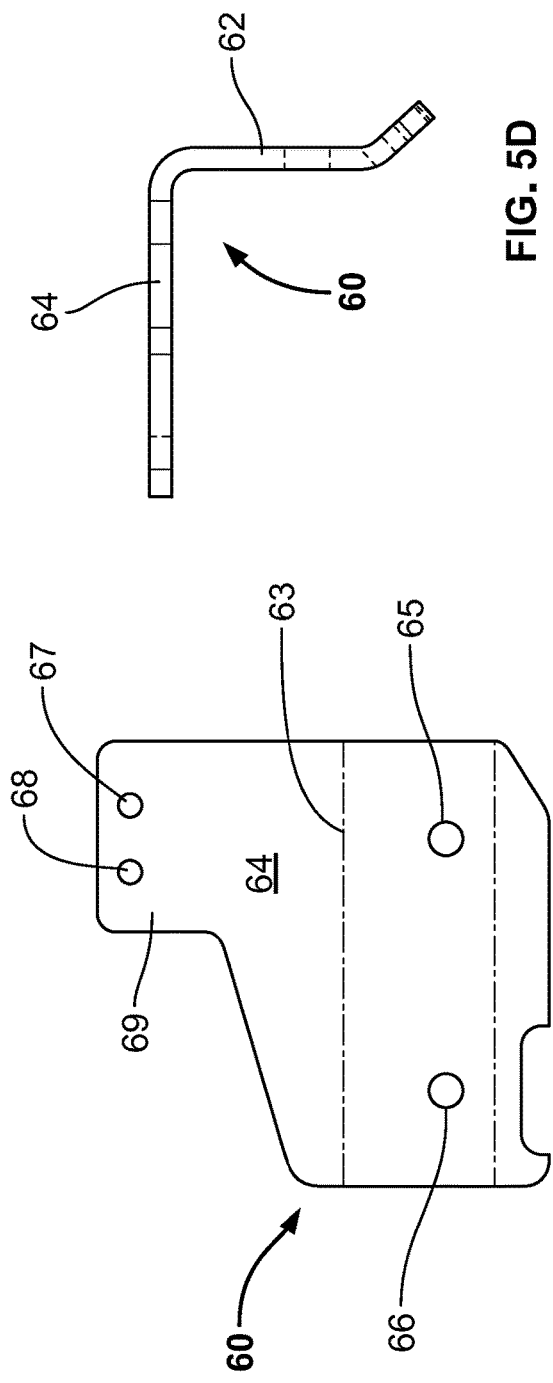
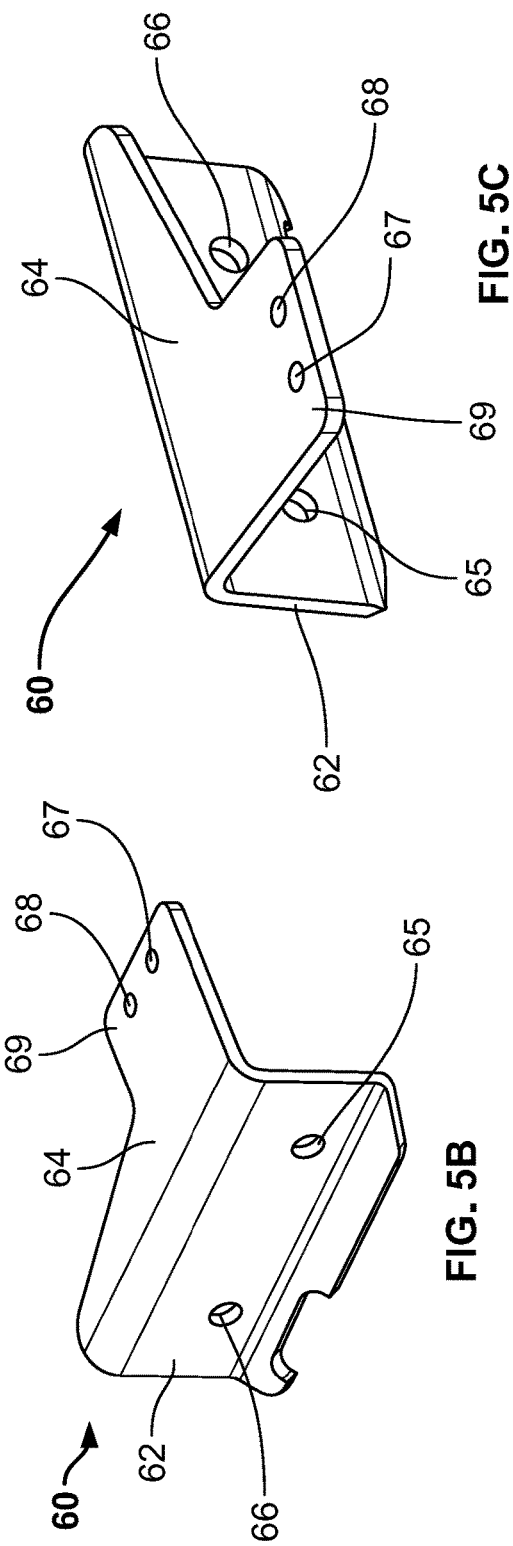
FIG. 5D
FIG. 5C
FIG. 5A
FIG. 5B

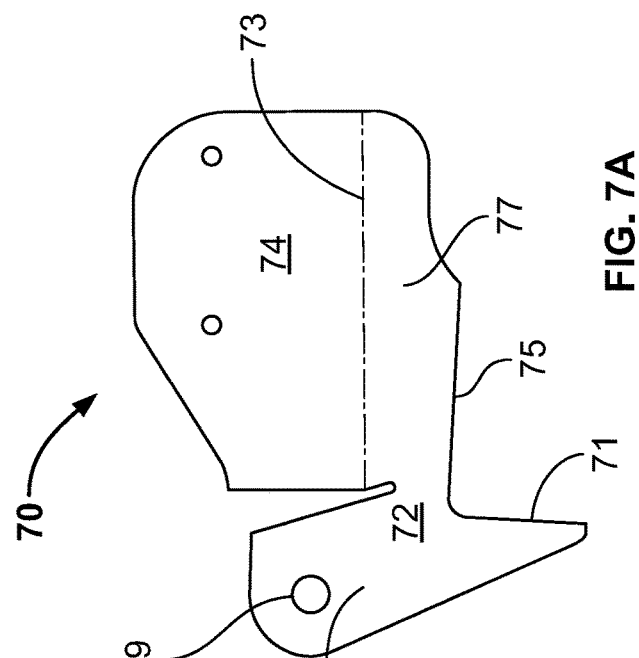
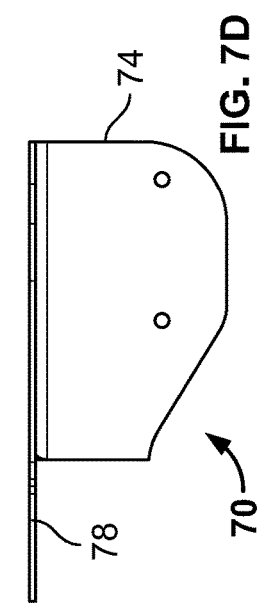
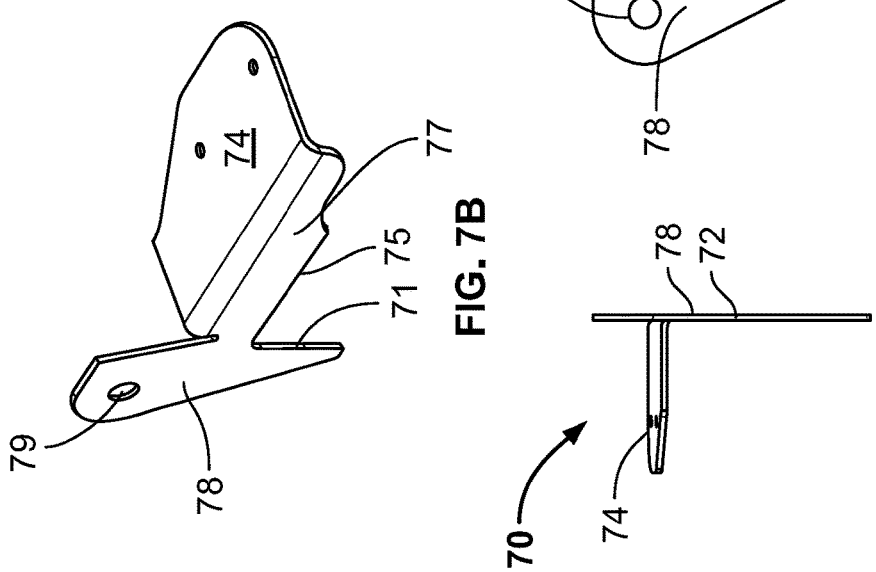
FIG. 7A
FIG. 7B
FIG. 7C
FIG. 7D
FIG. 7E

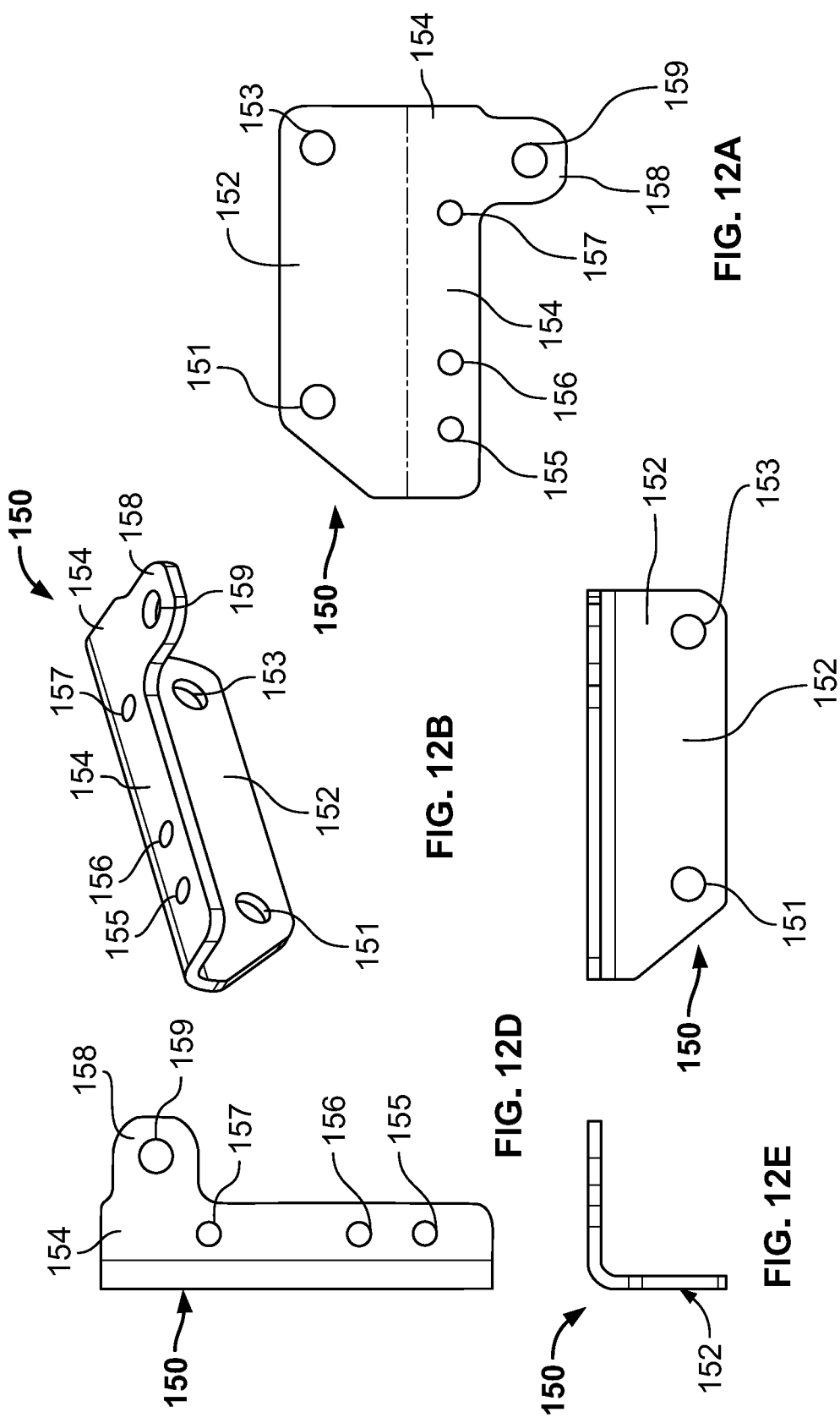

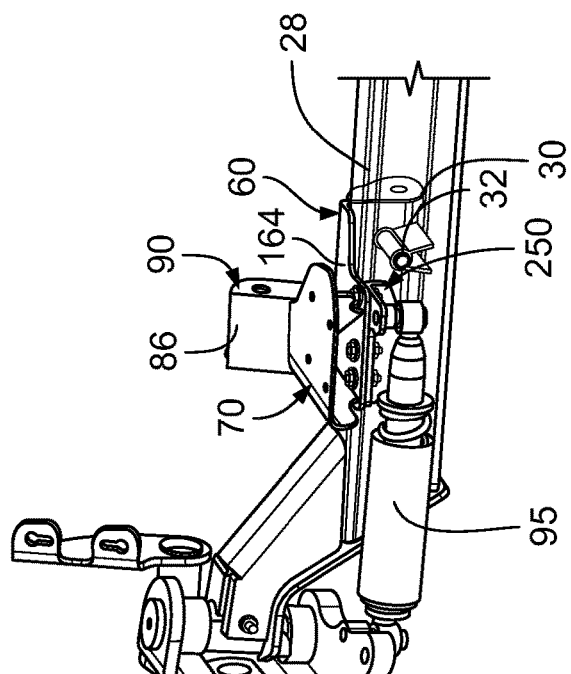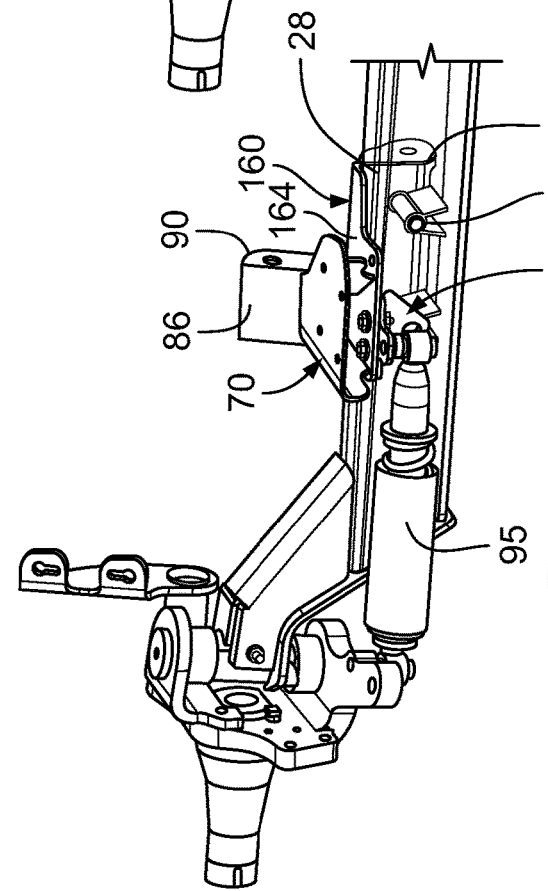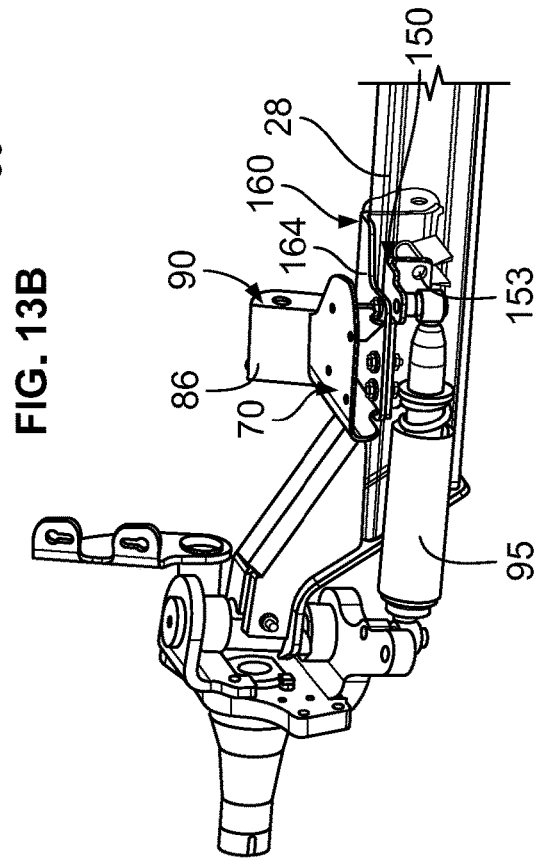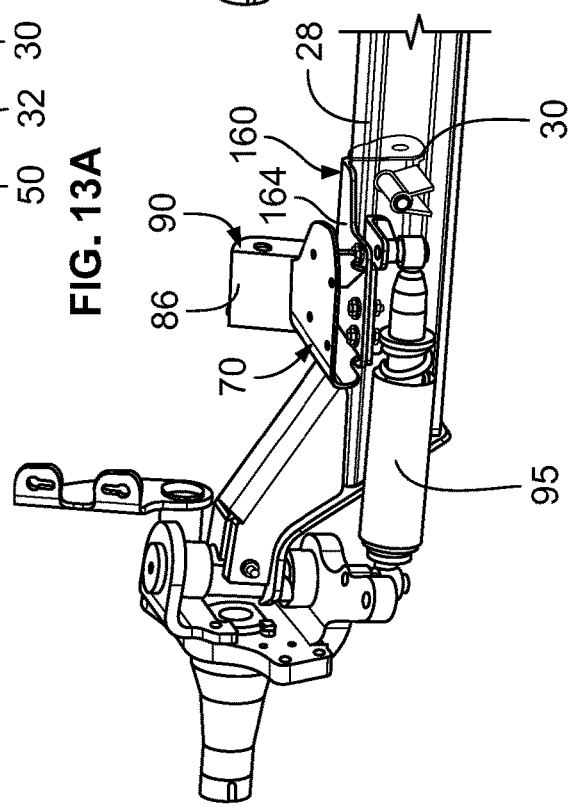

FABRICATED AXLE SEAT ASSEMBLY

CROSS-REFERENCE TO RELATED APPLICATIONS

The present application is a U.S. National Stage of International PCT Application No. PCT/US2018/052461, filed Sep. 24, 2018, which claims priority to U.S. Provisional Application No. 62/562,361 filed Sep. 23, 2017, both of which are hereby incorporated herein by reference.

FIELD OF THE DISCLOSURE

The present disclosure relates to vehicle suspension systems and related equipment and methods of securing, stabilizing and supporting energy storing and/or damping components, such as for example, an air spring or a leaf spring to an axle of a wheeled vehicle.

The present disclosure addresses the needs and/or shortcomings of prior art suspension systems.

Fabricated axle bodies have been developed that are strong, durable, weigh less and cost less in materials and labor to manufacture than forged I-beam axle bodies and other alternative technologies. Fabricated axle bodies are typically manufactured from sheets of steel that are cut, bent and then secured together by welding, threaded fasteners or other suitable means. They may have a hollow, box like construction having arcuate or rounded corners or transitions between adjacent flat surfaces, which result from bending and forming of the sheets of steel into the shape desired. Examples of known fabricated axles are shown and described in International Patent Application Publication No. WO2016/196375, and U.S. Pat. Nos. 8,616,566, 8,544,961, 7,862,058 and 6,609,764. Variances observed in dimensional tolerances of these and other components that are manufactured in this manner, along with other aspects of their construction that includes their exterior shape and reduced weight, generally hollow construction, may present challenges in how these components interface with and may be securely attached to other components in a removable and reversible manner while minimizing vibration and undesired movement of the components in relation to one another.

The present disclosure addresses the needs and/or shortcomings of prior art suspension systems and equipment.

SUMMARY OF THE INVENTION

There are several aspects of the present subject matter which may be embodied separately or together in the devices and systems described and claimed herein. These aspects may be employed alone or in combination with other aspects of the subject matter, and the description of these aspects together is not intended to preclude the use of these aspects separately or the claiming of such aspects separately as set forth in the claims appended hereto.

In one aspect of this disclosure, an axle seat assembly configured for attachment to a vehicle axle comprises a first piece and a second piece. The first piece of the axle seat assembly has a first wall and a second wall and a first axle seat piece engagement portion that provides a first engagement surface. The second piece of the axle seat assembly has a third wall and a second axle seat piece engagement portion provides a second engagement surface. The first wall and the second wall of the first piece are oriented to engage a front surface and a top surface of an axle body and the third wall of the second piece is oriented to engage a rear surface of an axle body. The first engagement surface of the first piece of the axle seat assembly and the second engagement surface of the second piece of the axle seat assembly are positioned and configured to engage one another to removably and reversibly secure with the use of a fastener the first piece to the second piece together to form the axle seat assembly In a second aspect of this disclosure, an axle seat assembly attached to an axle body comprises a first axle seat piece and a second axle seat piece. The first axle seat piece has a first wall, a second wall and a first axle seat piece engagement portion that provides a first engagement surface. The second axle seat piece has a third wall and a second axle seat piece engagement portion that provides a second engagement surface. An axle body has an exterior surface that includes a top surface, a bottom surface, a front surface and a rear surface. The first and second engagement surface of the respective first and second axle seat piece engagement portions are positioned to engage and be held together by a fastener. The first wall of the first axle seat piece is secured to the front surface of the axle body and the third wall of the second axle seat piece is secured to the rear surface of the axle body by a second fastener.

In a third aspect of this disclosure, a method of making an axle seat assembly having a first piece and a second piece includes providing a first plate, a second plate, and a third plate of the first piece of the axle seat assembly. The first plate is bent to create a bend line that separates a first section and a second section of the first plate and wherein the first section and the second section of the first plate are angled in relation to one another after the step of bending the first plate of the first piece of the axle seat assembly. The second plate is bent to create a bend line that separates a first section and a second section of the second plate. The first section and the second section of the second plate are angled in relation to another the step of bending the second plate of the first piece of the axle seat assembly. The third plate is bent to create a bend line that separates a first section and a second section of the third plate. The first section and the second section of the third plate are angled in relation to another after the step of bending the third plate of the first piece of the axle seat assembly. The first section of the second plate is secured to the first plate. The first section of the third plate is secured to the first plate.

A first plate of the second piece of the axle seat assembly is also provided. The first plate of the second piece is bent to create a bend line that separates a first and second section of the first plate of the second piece. The first and second sections of the first plate of the second piece are angled in relation to one another after bending.

The first axle seat piece is secured to the second axle seat piece with the use of a fastener. The first axle seat piece and the second axle seat piece are secure to an axle with the use of a second fastener.

BRIEF DESCRIPTION OF THE DRAWINGS

In describing the preferred examples, reference is made to the accompanying drawing figures.

FIG. 3A is a partially exploded, upper rear perspective, cross sectional view of the first embodiment, axle seat assembly configured for mounting to the left side of a vehicle axle similar to that shown in FIGS. 1A-1E and 2A-2C with the cross section taken perpendicular to the axle on the inboard side of the inboard axle seat fastener hole. FIG. 3A shows fasteners that secure the axle seat assembly to the vehicle axle and other fasteners that secure a first piece of the axle seat assembly to a second piece of the axle seat assembly.

FIG. 3B is a non-exploded, upper rear perspective, cross sectional view of the subject matter of FIG. 3A.

FIG. 4A is right side, upper front perspective view of a first piece of an axle seat assembly configured for the left side of a vehicle axle, which is also shown in FIGS. 1A-1E, 2A-2C, 3A and 3B.

FIG. 4B is a left side, upper front perspective view of the subject matter of FIG. 4A.

FIG. 4C is a rear view of the subject matter of FIG. 4A.

FIG. 4D is a right side elevational view of the subject matter of FIG. 4A.

FIG. 4E is a front elevational view of the subject matter of FIG. 4A.

FIG. 5A is a plan view of a first plate, in an unbent configuration, of the first piece of the axle seat assembly shown in FIG. 4A.

FIG. 5B is a right side, upper rear perspective view of the first plate of FIG. 5A in a bent configuration.

FIG. 5C is a left side, front upper perspective view of the first plate of FIG. 5A in a bent configuration.

FIG. 5D is a side elevational view of the first plate of FIG. 5A in a bent configuration.

FIG. 7A is a plan view of a second plate, in an unbent configuration, of the first piece of the axle seat assembly shown in FIG. 4A.

FIG. 7B is a right side, upper front perspective view of the second plate of FIG. 7A in a bent configuration.

FIG. 7C is a right side elevational view of the second plate of FIG. 7A in a bent configuration.

FIG. 7D is a bottom plan right side elevational view of the second plate of FIG. 7A in a bent configuration.

FIG. 7E is a rear, slight upper perspective view of the second plate of FIG. 7A in a bent configuration.

FIG. 12A is a plan view of a second piece, in an unbent configuration, of an axle seat assembly according to a further aspect of the present disclosure as shown in FIG. 13D.

FIG. 12B is a perspective view of the second piece shown in FIG. 12A in a bent configuration.

FIG. 12C is a rear elevational view of the second piece shown in FIG. 12A in a bent configuration.

FIG. 12D is a top plan view of the second piece shown in FIG. 12A in a bent configuration.

FIG. 12E is a side elevational view of the second piece shown in FIG. 12A in a bent configuration.

FIGS. 13A-13D shows variations of an axle seat assembly of the present disclosure mounted to the left side of a vehicle with the inboard end of the left side, steering damper arm attached to the second piece of the axle seat assembly.

DETAILED DESCRIPTION

Figure 1A:
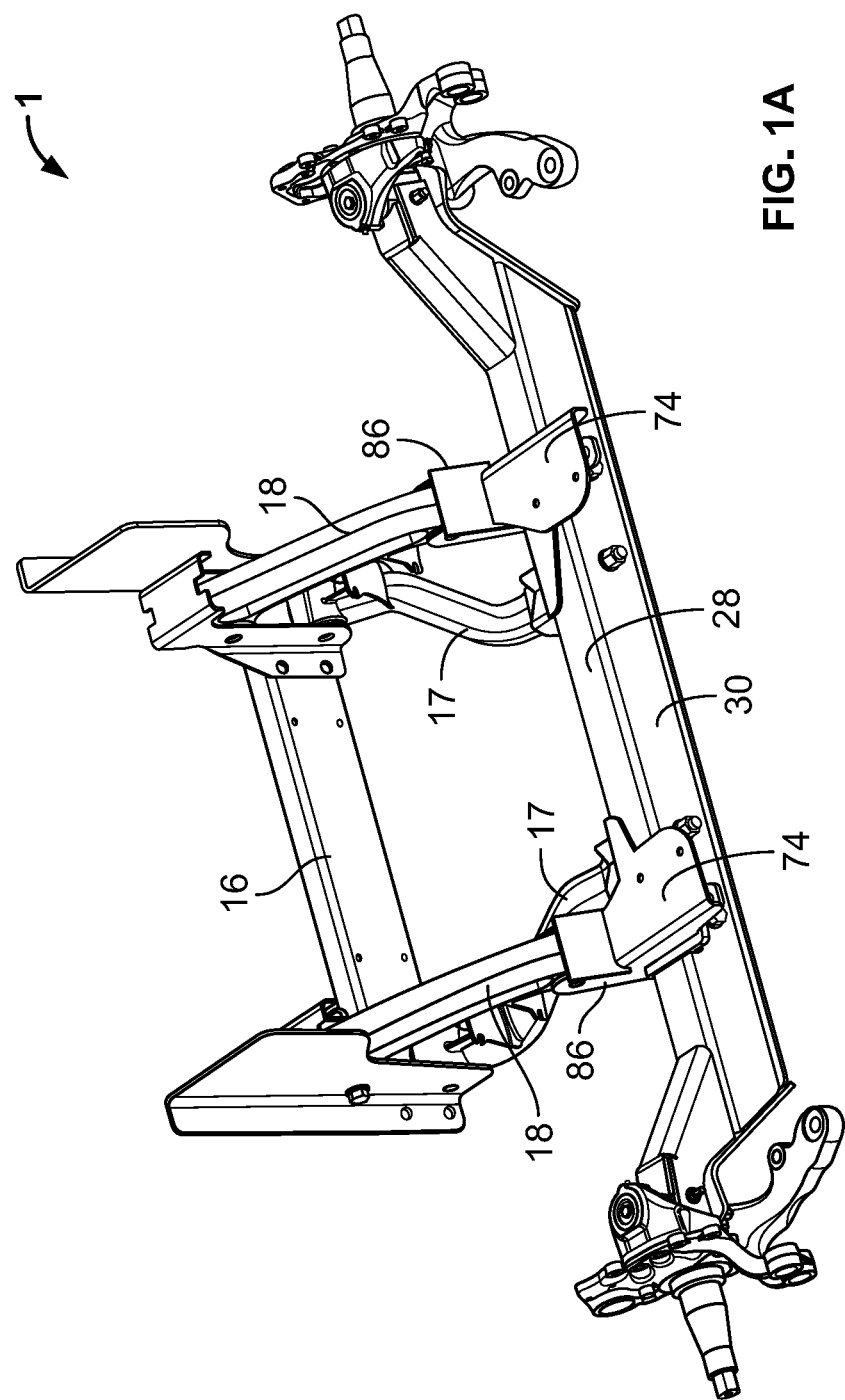
FIG. 1A is left side, upper rear perspective view of a portion of a lift axle suspension system incorporating an axle seat assembly according to a first embodiment of the present disclosure.
Figure 1B:
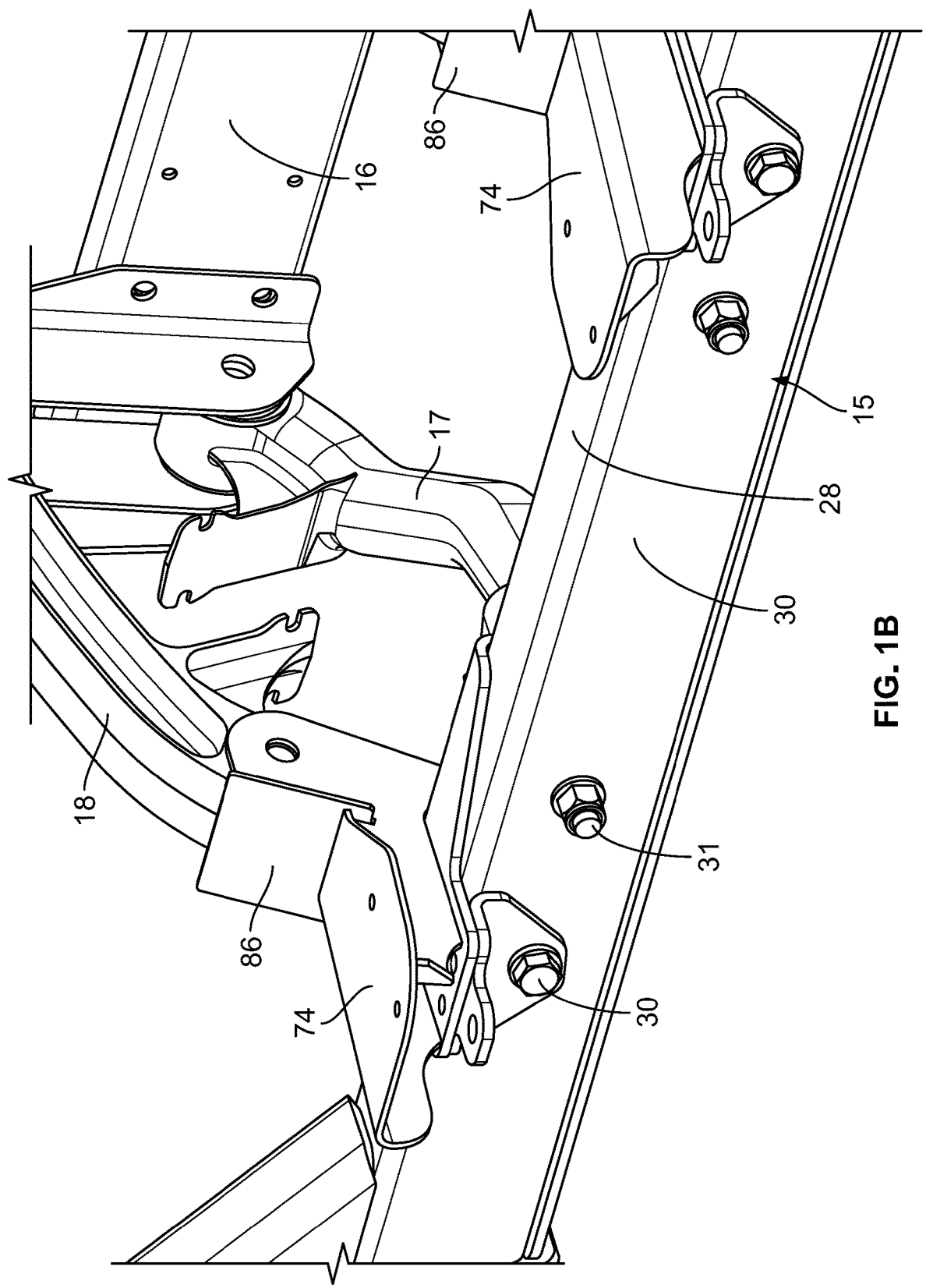
FIG. 1B is an enlarged right side, upper rear perspective view of a portion of the subject matter shown in FIG. 1A.

The embodiments disclosed herein are for the purpose of providing a description of the present subject matter, and it is understood that the subject matter may be embodied in various other forms and combinations not shown in detail. Therefore, specific designs and features disclosed herein are not to be interpreted as limiting the subject matter as defined in the accompanying claims.

As used herein, terms of direction (e.g., front, rear, outboard, inboard, vertical, horizontal, lateral, and longitudinal) are to be understood with reference to the orientation of the axle (or individual components or portions thereof) when associated with a wheeled vehicle, including a trailer, per conventional design.

A lift axle suspension system incorporating a first example axle seat assembly of the present disclosure is indicated in general at 1. An axle seat, also sometimes referred to as an axle chair, is a suspension component that sits on or contacts the outer surface of the axle body and provides a further surface or means of attaching one end or portion of an energy storing or damping component, such as an air spring or a leaf spring to the axle. Another end or portion of the energy storing or damping component is typically connected to the vehicle frame, often by way of a bracket.

The lift axle suspension system 1 includes an axle 10 having a channel 12 and a bottom plate 14, which may be wider than channel 12 to facilitate fastening of the bottom plate 14 to the channel 12 by a suitable technique, which may include welding. Channel 12 and bottom plate 14 may be made from a variety of suitable materials, such as for example, high strength steel or other suitable high-strength low alloy ("HSLA") steels which may be in sheet form. The left and right side of Axle 10 also has respectively, first and second gooseneck sections, at the distal ends of which are first and second head sections, each of which includes a king pin to which a steering knuckle is mounted. Upper lift arms 18 and lower lift arms 17 are pivotally connected both to the axle via the axle seat bracket assembly and to the vehicle frame via a bracket assembly that includes a cross channel member 16.

The example axle body to which an example axle seat assembly of the present disclosure is attached is shown in FIGS. 3A and 3B. The channel 12 of the example axle body 15 may resemble an upside down, generally U-shaped cross section that includes a front wall 26, a top wall 28 and a rear wall 30. The exterior surface of any one of the front, top, rear and bottom surfaces of the example axle body are generally perpendicular to the exterior surface of an adjacent side. The exterior surfaces between the front and top walls, and between the top and rear walls are round or arcuate as a result of the channel 12 being formed from a single sheet of steel and being bent or formed into shape. Front and rear walls 26,30 may include axle seat fastener holes 31,32 to permit mounting of an axle seat for suspension components. A torsion resistor and sleeve are inserted between the front and rear walls in registration with each fastener hole 31,32, as described and illustrated in WO2016/196375, to strengthen and render the axle body more resistant to torsional stresses.

As used herein, the term "U-shaped" is used broadly and is not limited to the illustrated configuration of channel 12 having a pair of downwardly extending front and rear walls 26, 30 that are generally perpendicular to a top wall 28. Other configurations within the scope of that term may include, for example, downwardly extending walls or legs that are inclined with respect to a top wall or curved to provide a generally C-shaped cross-section.

The axle seat assembly of the present disclosure may be used in combination with a fabricated axle, such as for example, is shown in FIGS. 3A and 3B, or as described and illustrated in WO2016/196375, U.S. Pat. Nos. 8,616,566, 8,544,961, 7,862,058 and 6,609,764, each of which are incorporated herein in their entireties. It will be appreciated, however, that the axle seat assembly of the present disclosure is not limited to use in combination with an axle having a shape or construction as shown in any of the foregoing cited patent applications or issued patents, and may be used in combination with, for example, axles that are solid or forged or irregular in shape or that have a cylindrical or partially cylindrical exterior surface without departing from the scope of the present disclosure.

The axle seat assembly 40 of the present disclosure assembly may be comprised of a first axle seat piece 42 and a second axle seat piece 50.

Figure 8B:
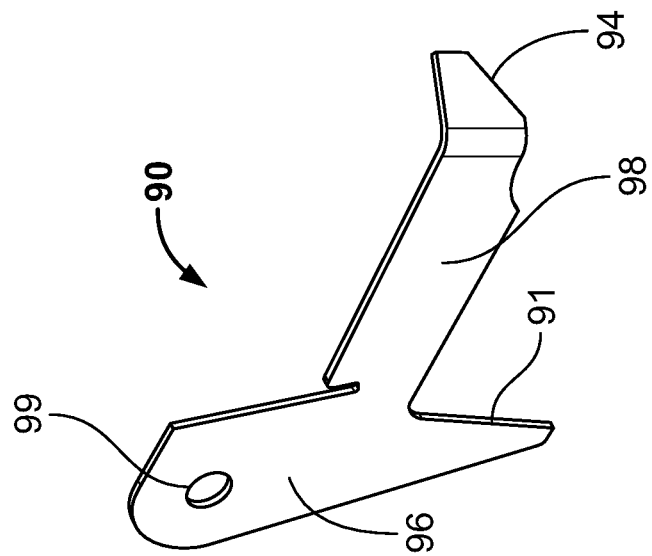
FIG. 8B is a perspective view of the third plate of FIG. 8A in a bent configuration.
Figure 8A:
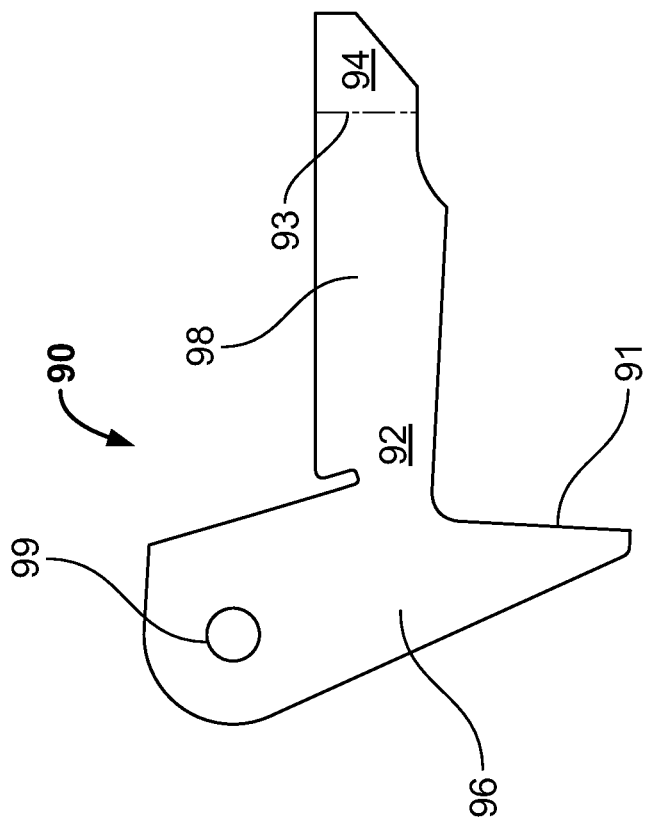
FIG. 8A is a plan view of a third plate, in an unbent configuration, of the first piece of an axle seat assembly shown in FIG. 4A.

The first axle seat piece 42 of the axle seat assembly may include a first plate 60 (FIGS. 5A-5D), a second plate 70 (FIGS. 7A-7E), and a third plate 90 (FIGS. 8A-8B). The second axle seat piece may include plate 50 (FIGS. 11A-11E). A portion 69 of the first axle seat piece 42 located at the distal end portion of the first plate 60, is positioned and configured to attach the first axle seat piece 42 to the second axle seat piece 50. A portion 54 of the second axle seat piece 44 is positioned and configured to attach the second axle seat piece 50 to the first axle seat piece 42. In the example axle seat assembly 40, the respective portions 69,54 of the first and second axle seat pieces are positioned and configured to engage one another to secure the first axle seat piece 42 and second axle seat piece 50 together. Each of the foregoing elements or features will now be discussed in further detail.

Turning to FIGS. 5A-5E, the first plate 60 of the first axle seat piece 42 serves as a support for the first axle seat piece 42, as shown in FIGS. 4A-4E, and includes a first section or first wall 62 and a second section or second wall 64 with the two sections or walls separated by a bend line 63. The first section 62 and second section 64 of the example first plate 60 are positioned flush with, respectively, the front surface or front wall 26, and the top surface or top wall 28 of the axle body 15. In the first example axle seat assembly 40, the first plate 60 preferably contacts only two of the four sides or surfaces of the axle body 15 with the first section 62 contacting the front surface 26 and the second section 64 containing the top surface 28.

The first plate 60 is preferably removably and reversibly secured to the axle body 15 by a suitable fastener arrangement (FIGS. 3A-3B). In this example, the first section 62 of the first plate 60 defines a first or outboard bore 65 and a second or inboard bore 66 (FIG. 4E). When placed in position for attachment to the axle body, each of the first and second bores 65,66 of the first plate 60 are aligned with axle seat fastener holes 31,32 defined in each of the rear wall 30 and the front wall 26 of the axle body. Fastener 9,11 are received in the outboard bore and the inboard bore of the first section of the first plate to secure the axle body.

The portion 69 of the first axle seat piece 42 that is positioned and configured for engagement with the second axle seat piece 44 to provide a means for removably and reversibly attaching the first and second axle seat pieces 42,44 together is positioned at the distal end portion of the first plate 60 of the first axle seat piece 42 and rearward of the rear wall 30 of the axle body 15 (FIGS. 3A,3B). This portion 69 of the first axle seat piece 42, which may also be referred to as the axle seat piece engagement portion 69 of the first axle seat piece 42, includes an engagement surface and first and second bores 67,68 and will be discussed further below.

The second axle seat piece 50 of the axle seat assembly 40 may include a plate having a first section or first wall 52 and a second section or second wall 54 with the two sections separated by a bend line 53 (FIGS. 11A-11E). The first section 52 of the second axle seat piece 50 defines a wall that is positioned for engagement with the rear wall or rear surface 30 of the axle body 15 (FIGS. 3A,3B). The first section 52 of the second axle seat piece 50 also defines a bore 51 that may be aligned with the outboard bore 65 in the first section 62 of the first axle seat piece 42. The same fastener 9 received in aligned bores 51 (second piece),31

(axle body), 65 (first wall of first plate) removably and reversibly secures the second axle seat piece 50 to the rear surface or rear wall 30 of the axle body. When fastener 11 received within the inboard bore 66 of the first section 62 of the first plate 60, and fastener 9 are tightened, the first and second axle seat pieces 42,50 are secured to the axle body 15 and the axle body is placed in compression. The axle body interfacing with two separate axle seat pieces rather than only an integrally formed single piece permits the axle seat assembly to be tightly fit to a number of different axle body types and to accommodate effectively and at a reduced cost, the anticipated and unanticipated variations in the precise dimensions of an axle body depending on how it is designed and manufactured. While the first piece and/or second piece of the axle seat assembly could be welded to the axle body if desired, when the first piece, the second piece or both are reversibly and removably secured to the axle body, this excludes that piece or pieces being welded to the axle body.

The second section 54 of the second axle seat piece 50 (FIG. 11B) defines a generally horizontally disposed wall that provides the portion of the second axle seat piece 50 that is positioned and configured for engagement with the first piece 42 of the axle seat assembly 40. This portion of the second axle seat piece 50, which may also be referred to as the axle seat piece engagement portion of the second axle seat piece 50, includes an engagement surface and first and second bores 55,56 that correspond with the engagement surface and first and second bores 67,68 of the axle seat piece engagement portion 69 of the first axle seat piece 42. When the respective engagement surfaces are bought into contact with one another and fasteners 3,5 received within respective bores are tightened, the first axle seat piece 42 and the second axle seat piece 50 are reversibly and removably secured to one another. The first axle seat piece 42 and the second axle seat piece 50 may be secured together before or after their attachment to the axle body. While the first piece and the second piece of the axle seat assembly could be welded together if desired, when the first and second pieces are reversibly and removably secured together, this excludes their being welded to one another.

As shown in FIG. 13, the second axle seat piece 50 may optionally include a vertical bore 59 (FIG. 11B) in the second section or second wall 54 for mounting the inboard end of a steering damper 95.

As shown in FIGS. 7A-7B, the second plate 70 of the first axle seat piece 42 may be considered to include a first section 72 and a second section 74, with the two sections 72 and 74 separated by a bend line 73. The first section 72 of the second plate 70 defines a vertically oriented ear 78 configured to be positioned on the first section 62 of the first plate 60 and a frame member or leg 77 configured to extend away from the ear 78 and across the second section 64 of the first plate 60. The lower interior edge 71 of the ear 78 may be configured to be supported by the first section 62 of the first plate 60, while the lower edge 75 of the frame member 77 may be configured to be supported upon the upper surface or top surface of the second section 64 of the first plate 60. In the illustrated embodiment, the ear 78 is provided with a hole or opening 79 positioned above the top surface 28 and forward of the front surface 26 of the axle body 15 and is configured for connecting the axle seat assembly 40 to an upper pivoting arm 18 of an axle lift assembly.

The second section 74 of the second plate 70 provides, when bent generally perpendicular to the first section 72, a platform or horizontally disposed wall to which the lower end of an air spring 19 or the like may be secured (FIG. 7B).

Figure 2A:
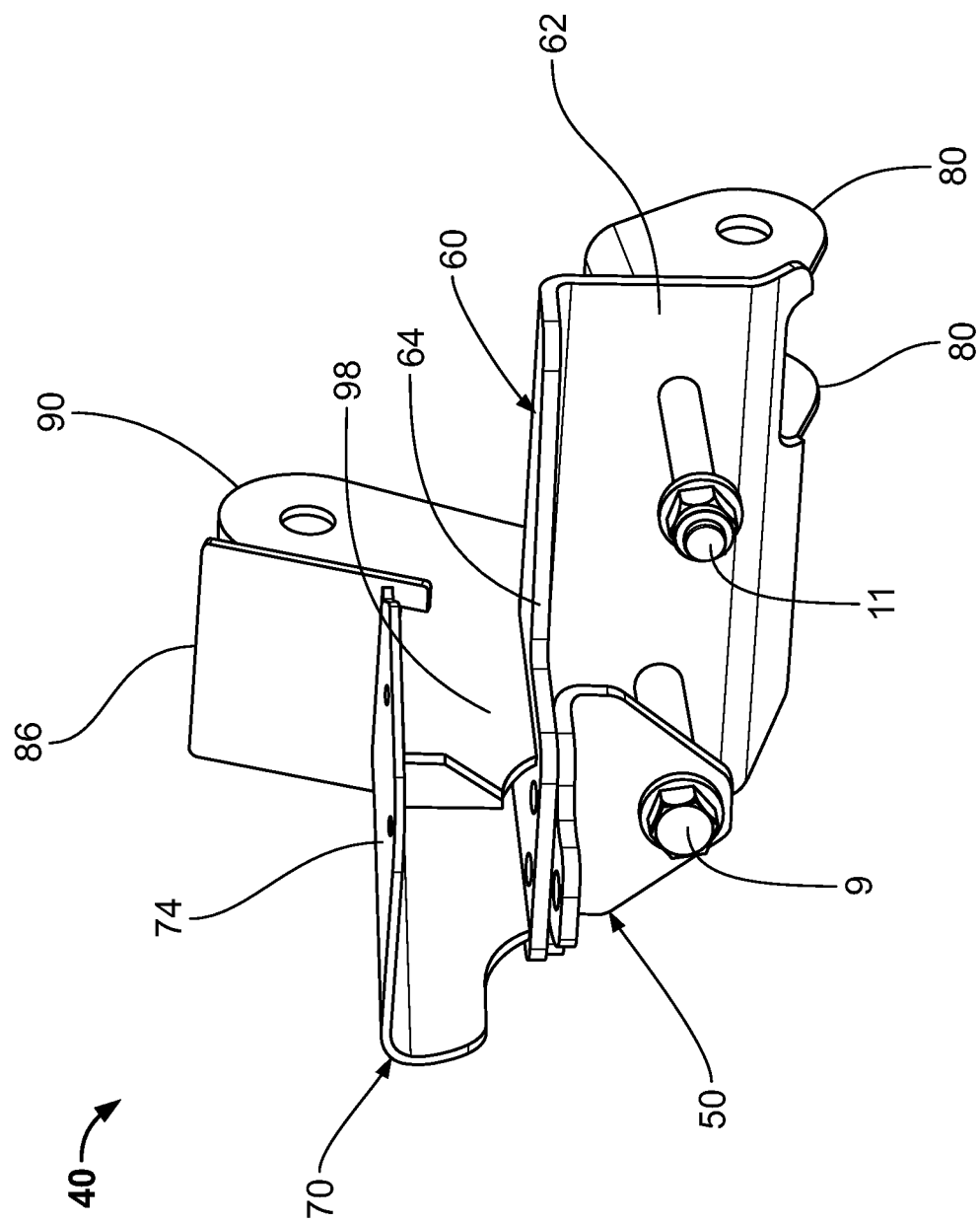
FIG. 2A is a right, rear perspective view of the axle seat assembly for the left side of the vehicle axle shown in FIGS. 1A-1E, with fasteners that secure the axle seat assembly to the vehicle axle and without fasteners that secure a first piece of the axle seat assembly to a second piece of the axle seat assembly.
Figure 2B:
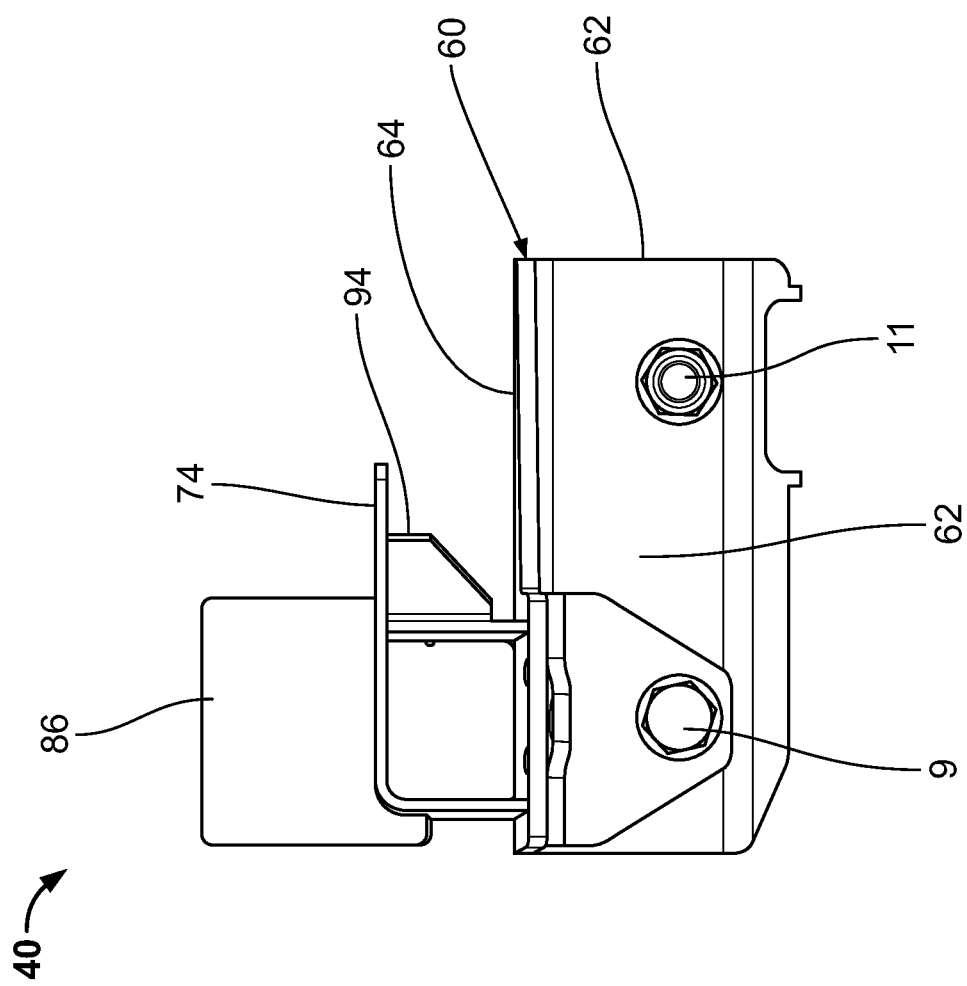
FIG. 2B is a rear elevational view of the subject matter of FIG. 2A.

The frame member 77 of the first section 72 elevates the second section 74 above the second section 64 of the first plate 60, as shown in FIGS. 2B and 4C.

Turning to FIGS. 8A-8B, the third plate 90 may be considered to include a first section 92 and a second section 94, with the two sections 92 and 94 separated by bend line 93. In a manner that is generally similar to first section 72 of the second plate 70, the first section 92 of the third plate 90 defines a vertically oriented ear 96 configured to be positioned on the first section 62 of the first plate 60 and a frame member or leg 98 configured to extend away from the ear 96 and across the top surface of the second section 64 of the first plate 60 (FIG. 4A). The second section 94 of the third plate 90 is angled in relation to the first section 92 and provides an additional support for the platform defined by the second section 74 of the second plate 70 (FIG. 4C).

Figure 1C:
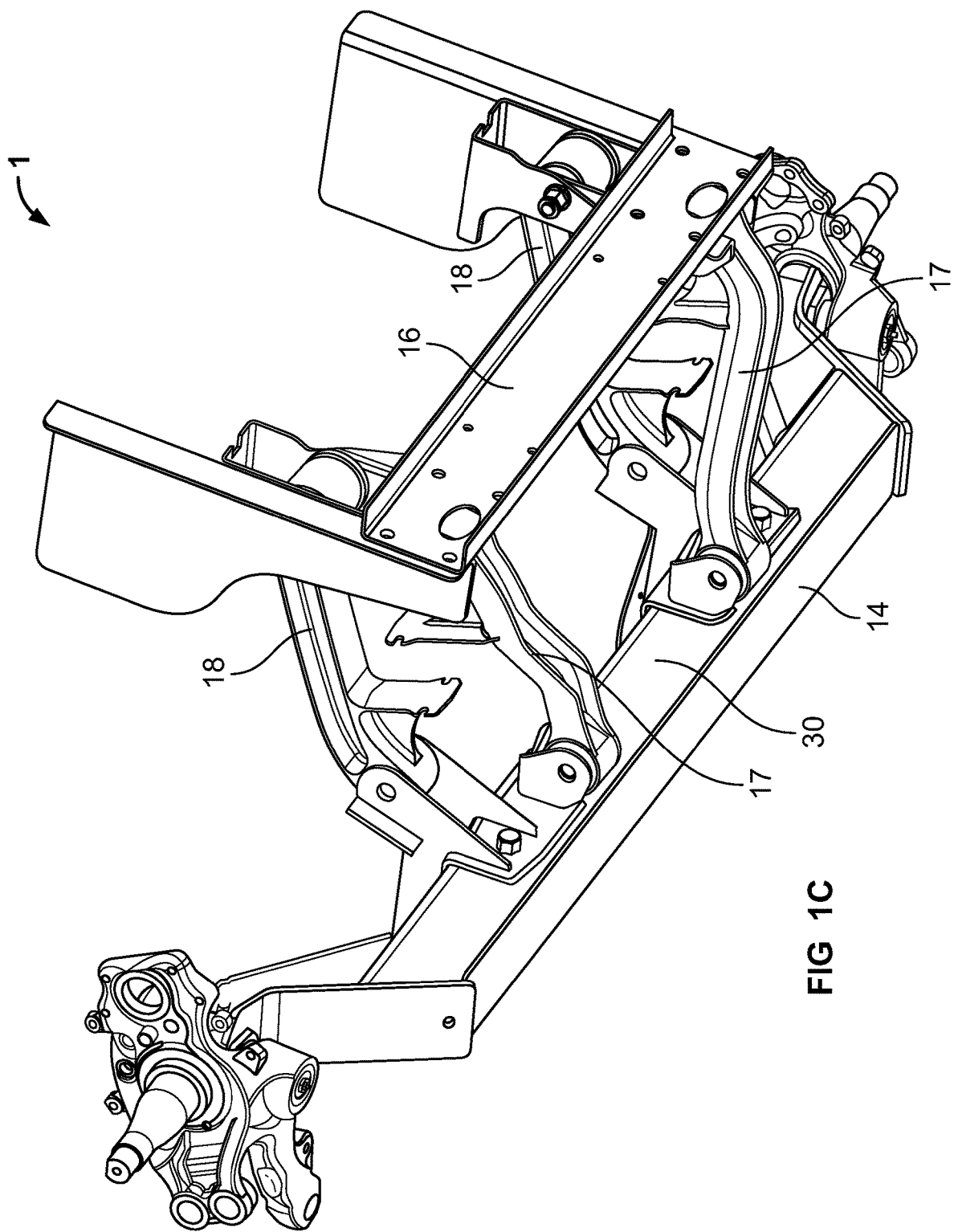
FIG. 1C is a right side, lower front perspective view of the subject matter shown in FIG. 1A.
Figure 1D:
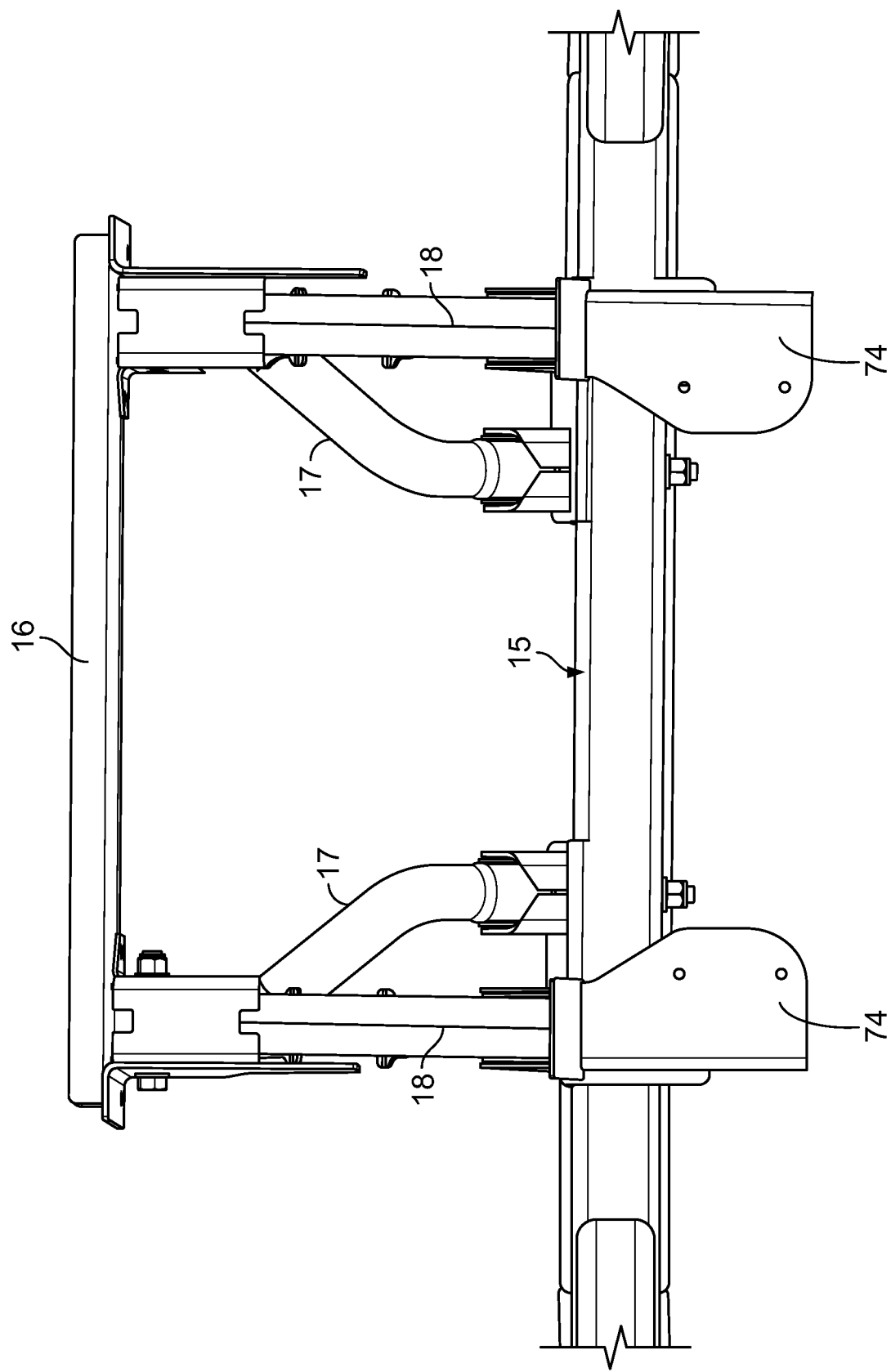
FIG. 1D is a top view of a portion of the subject matter shown in FIG. 1A.
Figure 1E:
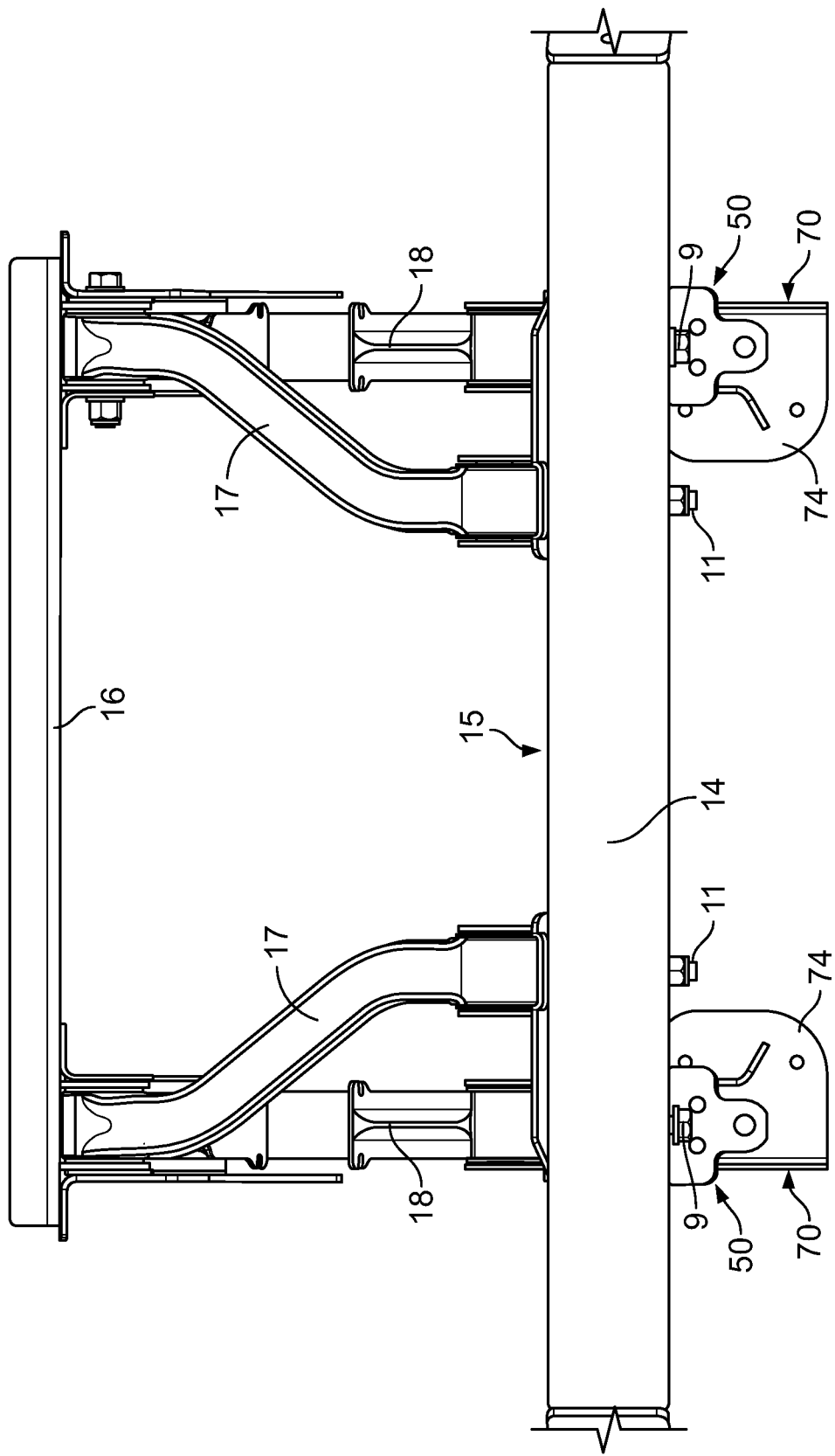
FIG. 1E is a bottom view of a portion of the subject matter shown in FIG. 1A.
Figure 9C:
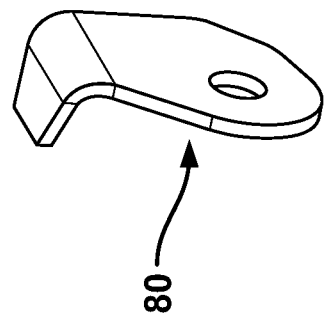
FIG. 9C is a right side perspective view of the plate of FIG. 9A, in a bent configuration, to form the right side of a bracket for pivotally mounting a lower lift arm to an axle seat assembly of the present disclosure, and which if bent in the opposite direction would form the left side of the same bracket.
Figure 9B:
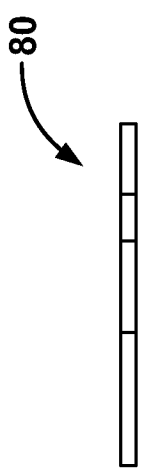
FIG. 9B is an elevational view of the plate of FIG. 9A in an unbent configuration.
Figure 9A:
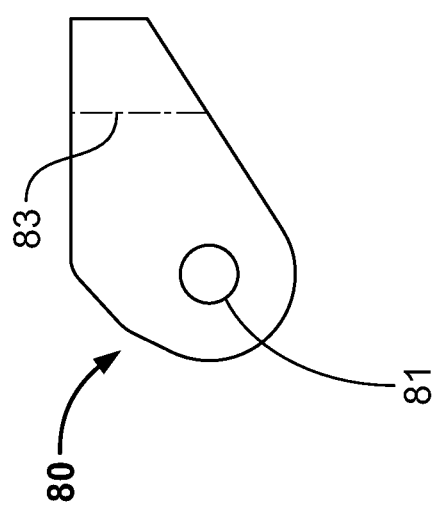
FIG. 9A is a plan view of a plate, in an unbent configuration, that forms a part of a bracket for pivotally mounting a lower lift arm to an axle seat assembly of the present disclosure.
Figure 10A:
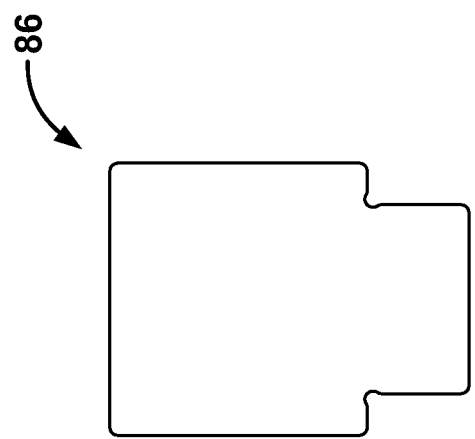
FIG. 10A is a plan view of a stabilizing plate of an axle seat assembly of the present disclosure.
Figure 10B:
FIG. 10B is a side elevational view of the stabilizing plate of FIG. 10A.
Figure 11A:
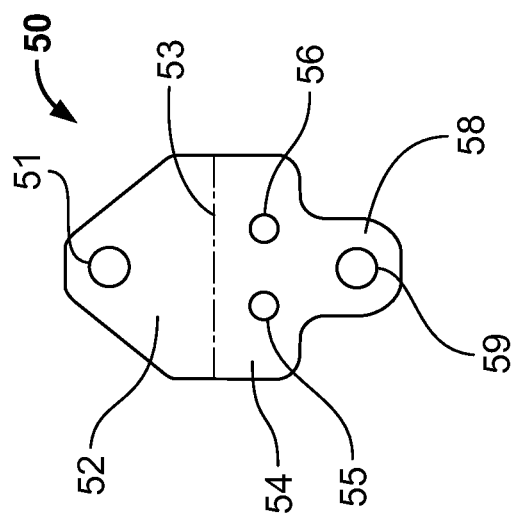
FIG. 11A is a plan view of a second piece, in an unbent configuration, of the axle seat assembly shown in FIGS. 1A-1E, 2A-2C, 3A and 3B.
Figure 11B:
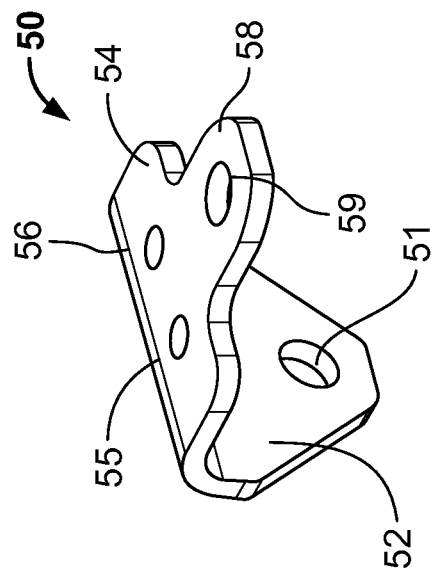
FIG. 11B is a perspective view of the second piece shown in FIG. 11A in a bent configuration.
Figure 11C:
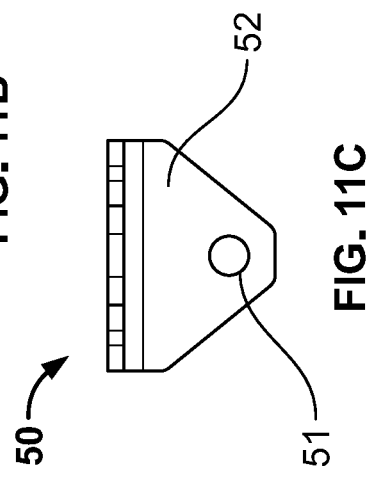
FIG. 11C is a rear elevational view of the second piece shown in FIG. 11A in a bent configuration.
Figure 11D:
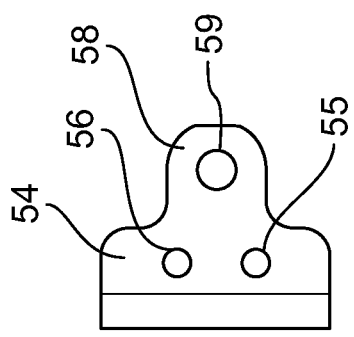
FIG. 11D is a top plan view of the second piece shown in FIG. 11A in a bent configuration.
Figure 11E:
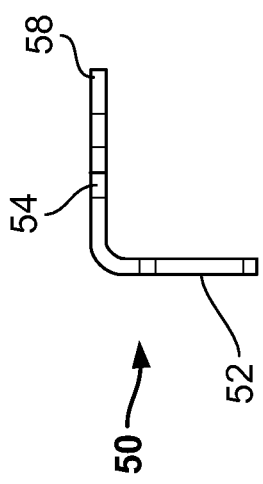
FIG. 11E is a side elevational view of the second piece shown in FIG. 11A in a bent configuration.
Figure 14:
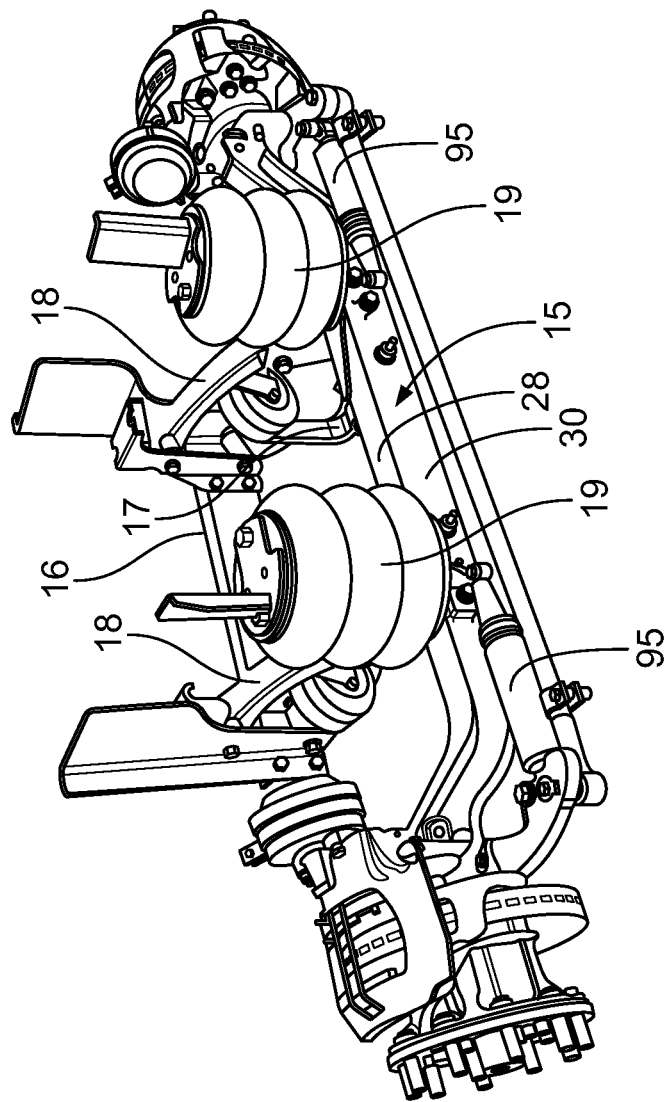
FIG. 14 is a lift axle suspension system incorporating an axle seat assembly of the present disclosure to which an air spring and steering dampers are mounted.

The lower pivoting arm 17 of the axle lift assembly can be secured to the axle seat assembly 40 by way of a bracket 85 secured on the exterior surface of the first wall of the first plate 60 in board of the second and third plates (FIGS. 4A-4B). Bracket 85 is formed from a pair of spaced apart, ear shaped plates 80 having a first section 82 and a second section 84, the two sections separated by a bend line 83 (FIGS. 9A-9C). The first section 82 includes a bore 81 for receiving one end portion of the pin of the pivot bushing of the lower lift arm. The second section 84 of the left side plate 80 is bent to the right. The second section of the right side plate 80 is bent to the left. The two plates together form the bracket 85 which is secured to the first section 62 of the first plate 60 of the axle seat assembly 40. The lower lift arm 17 is pivotally mounted to the bracket 85 by receipt of the central pin of the lower lift arm pivot bushing in mounting holes 81. The upper lift arm 18 is pivotally mounted to the axle seat assembly 40 by receipt of the central pin of the upper lift arm in mounting holes 79,99 positioned above and in front of the axle body in the ears 78, 96 of the second and third plates 70,90. As shown in FIGS. 1A, 1C and 1F, the lower lift arm pivotally attaches to the axle seat bracket assembly inboard of the location of pivotal attachment of the upper lift arm. The opposing ends of the lower lift and upper lift arm are laterally aligned and vertically offset at the locations of their pivotal attachment to a bracket assembly which in turn is connected to the vehicle frame.

Figure 2C:
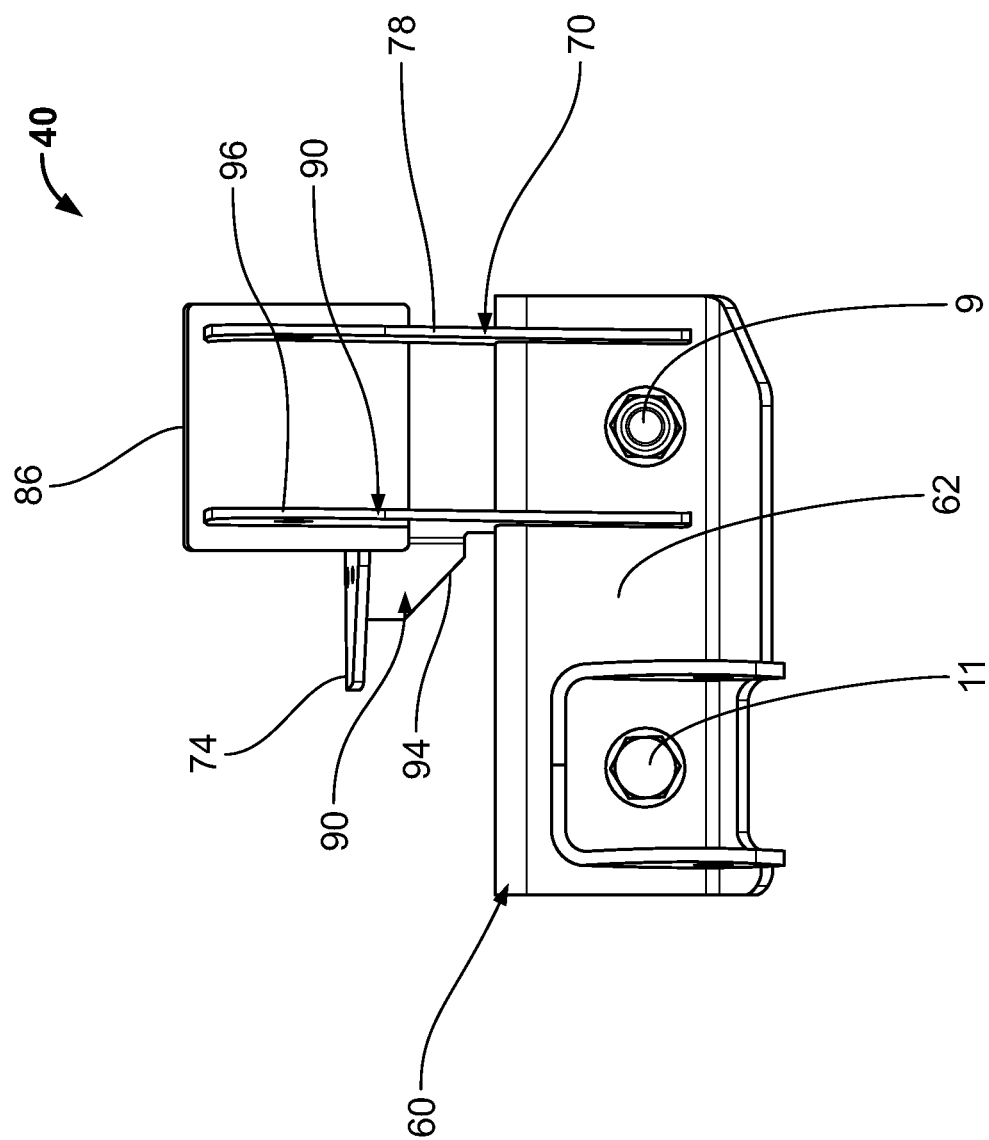
FIG. 2C is a front elevation view of the subject matter of FIG. 2A.
Figure 6A:
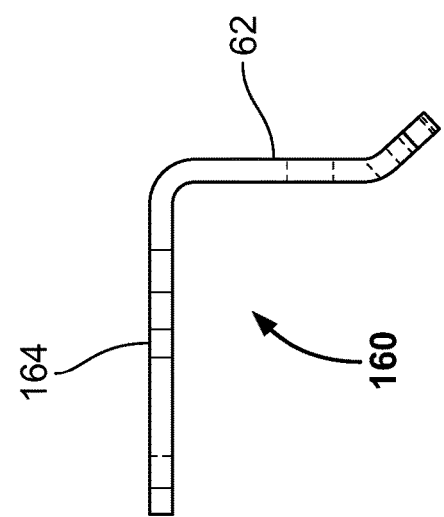
FIG. 6A is a plan view of a first plate, in an unbent configuration, of a first piece of an axle seat assembly configured for the left side of a vehicle axle according to a further aspect of the present disclosure.
Figure 6B:
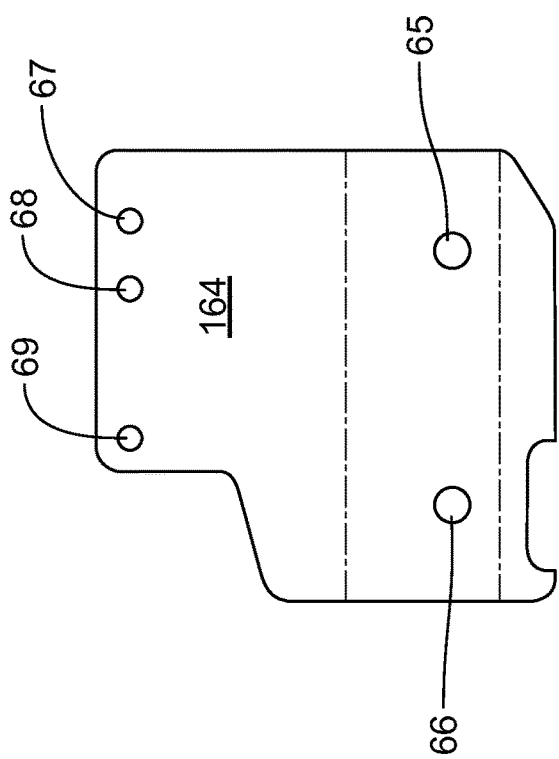
FIG. 6B is a right side, upper rear perspective view of the first plate of FIG. 6A in a bent configuration.
Figure 6D:
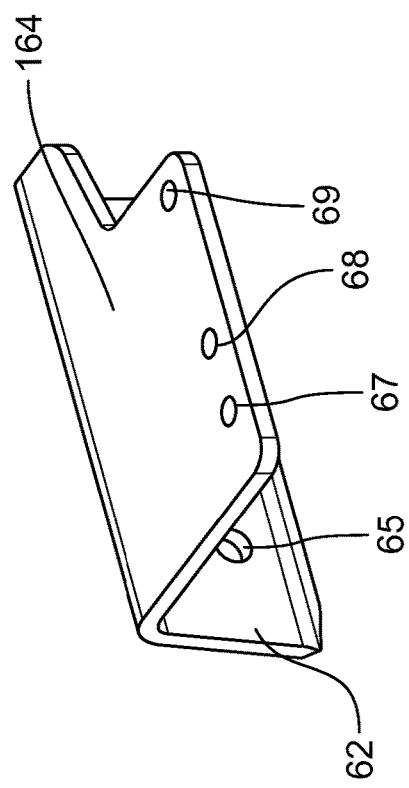
FIG. 6D is a side elevational view of the first plate of FIG. 6A in a bent configuration.
Figure 6C:
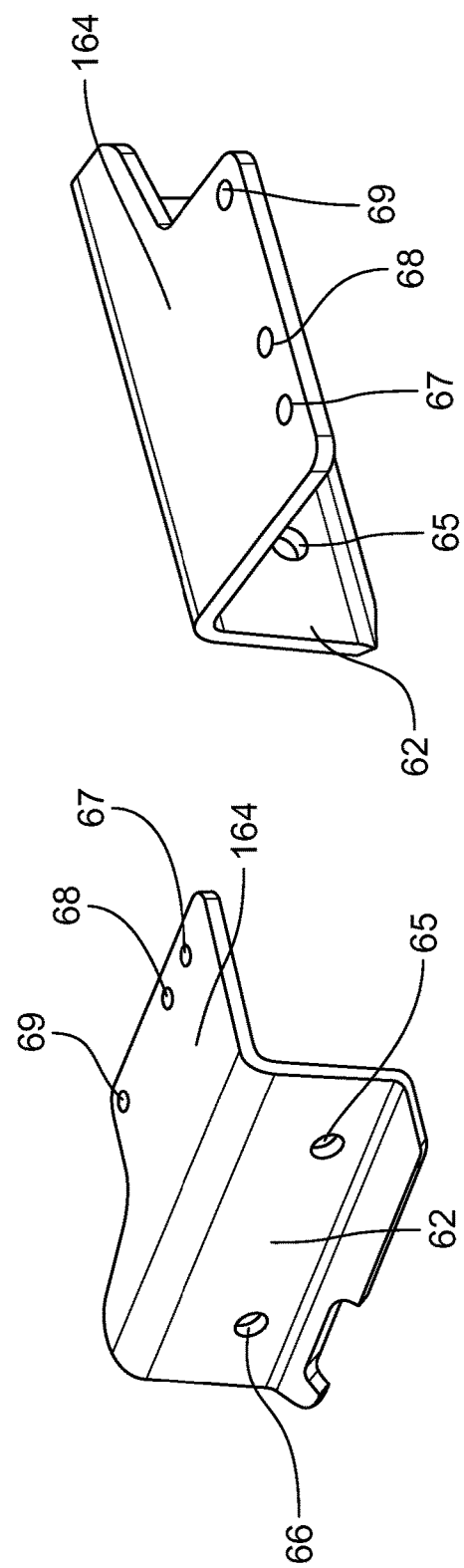
FIG. 6C is a left side, front upper perspective view of the first plate of FIG. 6A in a bent configuration.

With the second and third plates 70 and 90 in their bent configurations, the second and third plates 70 and 90 may be arranged with the first sections 72 and 92 generally parallel to each other and spaced an appropriate distance apart as shown in FIG. 2C. The second section 74 of the second plate 70 which forms a platform or horizontally disposed wall may be arranged so as to extend toward the third plate 90, with the second section 94 of the third plate 90 extending away from the first section 72 of the second plate 70. The second section 94 of the third plate 90 may be secured to the underside of the second section 74 of the second plate 70. A stabilizing plate 86 (FIG. 1) may be attached to the ears 79,99 to provide additional stability, strength, and rigidity to the axle seat assembly 40, if desired.

The first sections 72 and 92 of the second and third plates 70 and 90 may be secured to the top surface of the first plate 60 by any suitable, permanent or reversible, fastener arrangement (e.g., welding or mechanical fasters). For example, the axle seat assembly may be welded at the edges of the interface between the first, second and third plates and the stabilizing plate 86 (e.g., between the top surface of the first plate 60 and the lower edge of the frame members 77, 98 and the lower interior edge of the ears 71,91, between the top edge of the frame member 98 of the third plate 90 and the bottom surface of the platform 74, and between the stabilizing plate 86 and the first, second and third plates 60, 70, 90. The axle seat assembly 40 may then be connected to other vehicle components, such as the ears 78 and 96 being connected to pivoting arms of an axle lift assembly and the second section 74 of the second plate 70 being connected to an air spring 19 or the like.

It will be appreciated the axle seat assembly can be variously configured without departing from the scope of the present disclosure.

For example, as shown in FIGS. 12B and 13B-13D, the first section or first wall 152 of the second piece 150 of the axle seat assembly may include more than one bore each of which is aligned with a corresponding bore in the first section of the first plate and intervening bores in the front wall and rear wall of the axle body.

The respective axle seat piece engagement portions 69, 54 of the first and second axle seat pieces 60, 50 by which the first and second axle seat pieces are removably and reversibly secured to one another may also be varied, independently or in coordination with one another to achieve any one of a number of objectives, including but not limited to providing an inboard side, point of attachment of a steering damper to the second axle seat piece at a controlled distance from the end of the axle (which may be held constant if desired) despite variations in the size or the length of the axle or in the location of bores 30 or 31 (see FIG. 3B vs. 13A vs. 13B-13D).

We claim:

1. An axle seat assembly configured for attachment to an axle body of a vehicle axle, the axle body having a top surface, a bottom surface a front surface and a rear surface, the axle seat assembly comprising:
   a first axle seat piece and a second axle seat piece,
   the first axle seat piece of the axle seat assembly having a first wall, a second wall and a first axle seat piece engagement portion providing a first engagement surface,
   the second axle seat piece of the axle seat assembly having a third wall and a second axle seat piece engagement portion providing a second engagement surface,
   wherein the first wall and the second wall of the first piece are oriented to engage respectively, the front surface and the top surface of the axle body and wherein the first axle seat piece engages only two of the top surface, the bottom surface, the front surface and the rear surface of the axle body, and the third wall of the second piece is oriented to engage a rear surface of the axle body, and
   wherein the first engagement surface of the first piece of the axle seat assembly and the second engagement surface of the second piece of the axle seat assembly are positioned and configured to engage one another to removably and reversibly secure with the use of a fastener the first piece to the second piece to form an axle seat assembly.

2. The axle seat assembly of claim 1, wherein the second axle seat piece engages only one of the top surface, the bottom surface, the front surface and the rear surface of the axle body.

3. An axle seat assembly attached to an axle body, the axle seat assembly and axle body comprising:
   a first axle seat piece and a second axle seat piece,
   the first axle seat piece having a first wall, a second wall and a first axle seat piece engagement portion providing a first engagement surface,
   the second axle seat piece having a third wall and a second axle seat piece engagement portion providing a second engagement surface,
   an axle body having an exterior surface that includes a top surface, a bottom surface, a front surface and a rear surface,
   wherein the first wall of the first axle seat piece having a first axle body engagement surface abutting the front surface of the axle body, the second wall of the first axle seat piece having a second axle body engagement surface abutting the top surface of the axle body, the third wall of the second axle seat piece having a third axle body engagement surface abutting the rear surface of the axle body,
   wherein the first and second engagement surfaces of the respective first and second axle seat piece engagement portions are positioned to engage and be held together by a first fastener, and
   wherein the first axle seat piece engages only two of the top surface, the bottom surface, the front surface and the rear surface of the axle body, and the first wall of the first axle seat piece is secured to the front surface of the axle body, and the third wall of the second axle seat piece is secured to the rear surface of the axle body by a second fastener.

4. The axle seat assembly attached to the axle body of claim 3, wherein the first axle body engagement surface and the third axle body engagement surface placing the axle body in a state of compression.

5. The axle seat assembly attached to the axle body of claim 3, the second engagement surface of the second axle seat piece engagement portion positioned to engage the first engagement surface of the first axle seat piece engagement portion, the respective second and first engagement surfaces abutting and secured to one another by the first fastener positioned at a location rearward of the third wall of the second axle seat piece.

6. The axle seat assembly attached to the axle body of claim 3, the first engagement surfaces of the first axle seat piece or the second engagement surface of the second axle seat piece or both extending in a direction that is not parallel to the third axle body engagement surface of the second axle seat piece.

7. The axle seat assembly attached to the axle body of claim 3, the first engagement surfaces of the first axle seat piece or the second engagement surface of the second axle seat piece or both extending in a direction that is perpendicular to the third axle body engagement surface of the second axle seat piece.

8. The axle seat assembly attached to the axle body of claim 3, the first axle seat piece having a fourth wall positioned above the second wall and supported by a first leg extending between the second wall and the fourth wall and configured for attachment to a bottom portion of an air spring.

9. The axle seat assembly attached to the axle body of claim 8, the fourth wall of the first axle seat piece supported by a second leg extending between the second wall and the fourth wall, and the second wall, the first leg, the fourth wall, and the second leg defining a hollow interior space of the axle seat assembly.

10. The axle seat assembly attached to the axle body of claim 3, the first wall of the first axle seat piece having a first bore and the third wall of the second axle seat piece having a second bore, the respective first and second bores positioned in alignment with one another on opposing sides of the axle body, the first axle seat piece and the second axle seat piece secured to the axle body by the second fastener.

11. The axle seat assembly attached to the axle body of claim 3, the first axle body engagement surface, the second axle body engagement surface, and/or the third axle body engagement surface being generally planar.

12. The axle seat assembly attached to the axle body of claim 3, the front surface, the top surface and the rear surface of the axle body being generally planar.

13. The axle seat assembly attached to the axle body of claim 3, wherein the exterior surface of the axle body is arcuate or rounded between the front surface and the top surface and between the rear surface and the top surface.

14. The axle seat assembly attached to the axle body of claim 3, the second wall of the first axle seat piece configured to extend across the top surface of the axle body in the direction of the second axle seat piece, tapering from a first width to a second width.

15. The axle seat assembly attached to the axle body of claim 3, wherein the second axle seat piece engages only one of the top surface, the bottom surface, the front surface and the rear surface of the axle body.

16. A method of making an axle seat assembly having a first axle seat piece and a second axle seat piece, comprising the steps of:
   providing a first plate, a second plate, and a third plate of an axle seat assembly,
   bending the first plate to create a bend line that separates a first section and a second section of the first plate and wherein the first section and the second section of the first plate are angled in relation to another after said step of bending the first plate of the first axle seat piece of the axle seat assembly,
   bending the second plate to create a bend line that separates a first section and a second section of the second plate and wherein the first section and the second section of the second plate are angled in relation to another after said step of bending the second plate of the first axle seat piece of the axle seat assembly,
   bending the third plate to create a bend line that separates a first section and a second section of the third plate and wherein the first section and the second section of the third plate are angled in relation to one another after said step of bending the third plate of the first axle seat piece of the axle seat assembly
   securing the first section of the second plate to the first plate,
   securing the first section of the third plate to the first plate,
   providing a first plate of a second axle seat piece of the axle seat assembly,
   bending the first plate of the second axle seat piece of the axle seat assembly to form a first section and a second section of the second axle seat piece and wherein the first section and the second section of the first plate of the second axle seat piece of the axle seat assembly are angled in relation to one another and separated by a bend line created by said step of bending the first plate of the second axle seat piece,
   securing the first axle seat piece to the second axle seat piece with the use of a first fastener, and
   securing the first axle seat piece and the second axle seat piece to an axle with the use of a second fastener.

17. The method of claim 16 wherein the step of securing the first axle seat piece to the second axle seat piece with the use of a first fastener occurs before the step of securing the first axle piece and the second axle piece to an axle with the use of a second fastener.

18. The method of claim 16 wherein the step of securing the first axle seat piece to the second axle seat piece with the use of a first fastener occurs after the step of securing the first axle seat piece and the second axle seat piece to an axle with the use of a second fastener.

19. The method of claim 16 wherein the step of securing the first axle seat piece to the second axle seat piece with the use of a first fastener removably and reversibly secures the first axle seat piece to the second axle seat piece.

20. The method of claim 16 wherein the step of securing the first axle seat piece and the second axle seat piece to an axle with the use of a second fastener removably and reversibly secures the first axle seat piece and the second axle seat piece to the axle.

* * * * *